J. L. LA COUR.
PROCESS FOR THE ABSORPTION OF NITROUS GASES.
APPLICATION FILED OCT. 22, 1918.
1,348,227.
Patented Aug. 3, 1920.
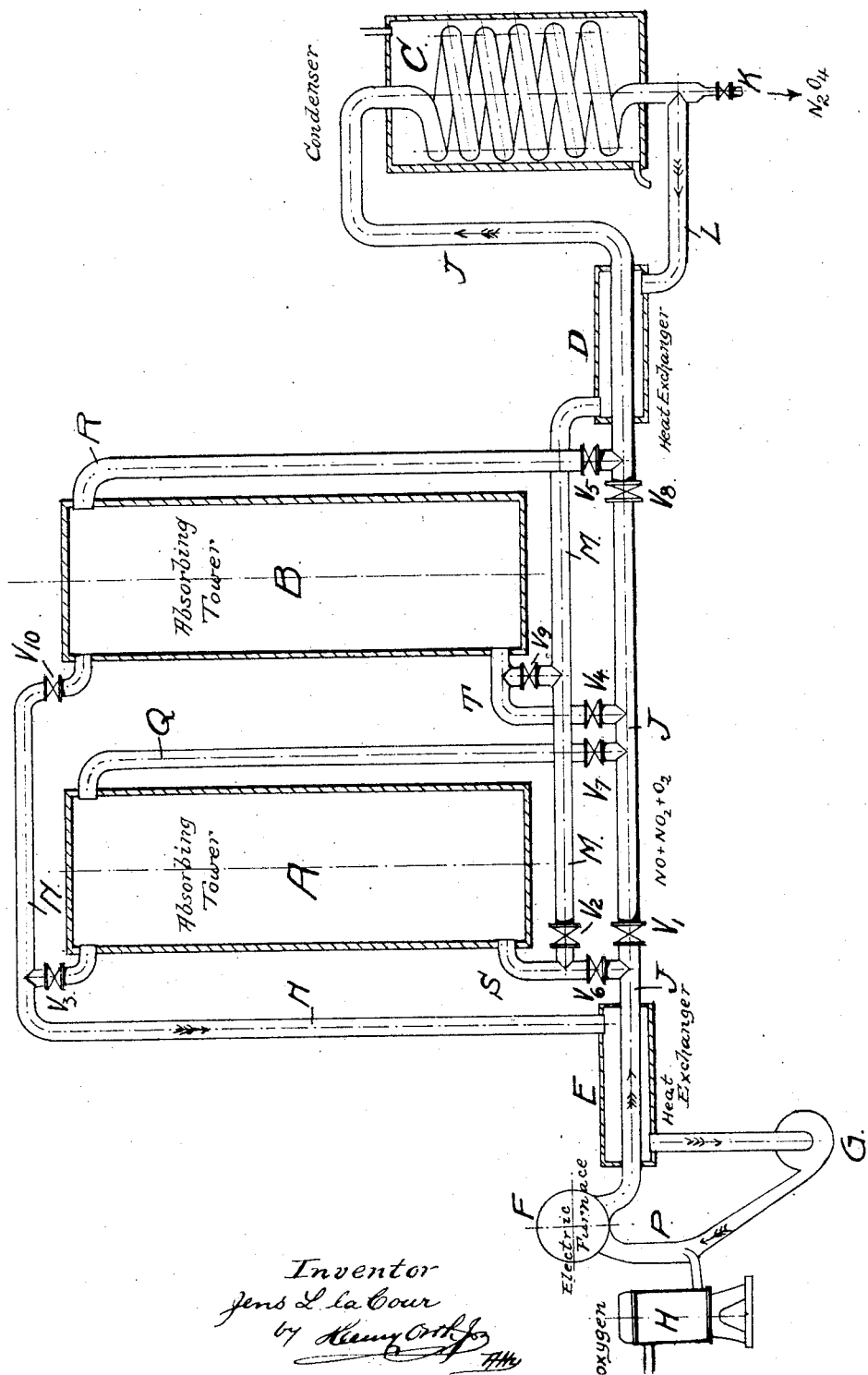
Inventor
Jens L. la Cour
by Henry Orth Jr.

UNITED STATES PATENT OFFICE.

JENS LASSEN LA COUR, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS FOR THE ABSORPTION OF NITROUS GASES.

1,348,227.     Specification of Letters Patent.     Patented Aug. 3, 1920.

Application filed October 22, 1918. Serial No. 259,294.

*To all whom it may concern:*

Be it known that I, JENS LASSEN LA COUR, a subject of the King of Sweden, residing at Christiania, Norway, have invented certain new and useful Improvements in Processes for the Absorption of Nitrous Gases; and I do hereby declare the following to be a full, clear, and exact description of the invention, such as will enable others skilled in the art to which it appertains to make and use the same.

This invention relates to the absorption of nitrous gases in a cyclic system and has for its object an improved method of carrying such absorption into effect.

For effecting the absorption of nitrous gases in a cyclic system any known method may of course be employed when suitably modified. If the nitrogen oxids however are absorbed in water or aqueous solutions the residual gases must be dried before they can be returned into the electric furnaces. It has therefore been suggested to effect the absorption either in sulfuric acid or in dry bases. The absorption in sulfuric acid however involves several difficulties especially in the denitration of the obtained nitrosyl-sulfuric acid. On the other hand the absorption in dry bases produces a product of a lower value.

A third method of recovering the nitrous gases consists in strongly cooling these latter so as to effect the freezing out of the gases in the form of $N_2O_3$ and $N_2O_4$ or as a mixture of these oxids. Also this method is however connected with several drawbacks. In fact very large refrigeration plants with a large expenditure of energy are required for the refrigeration of such dilute gases as are usually obtained from the electric oxidation furnaces particularly when the furnaces are working substantially under atmospheric pressure, and notwithstanding this the residual gases leaving the refrigeration plant will contain a considerable percentage of nitrogen compounds, which when directly introduced into the electric furnaces will be lost because they become decomposed into their components.

According to the present invention and as illustrated diagrammatically in the drawing these disadvantages are avoided by freezing out the greater part of the nitrogen compounds by cooling the gases down to extremely low temperatures in a condenser plant C and by absorbing the last traces of the nitrogen compounds by passing the residual gas in contact with dry bases such as slaked lime in absorption towers A, B. By working in this manner the gases then remain dry all along and can again be returned to the electric furnaces.

To enable the dry bases to absorb the residual gases, these latter should be heated to a rather high temperature. This is most efficiently effected by passing the residual gases in counter current to the hot furnace gases through a preheater D (interchanger) in which the gases leaving the furnace F deliver part of their heat to the cold gases from the refrigeration plant C. On leaving the absorption tower containing the dry bases the gas is still so hot that it without being preheated or after a slight heating in a heater E may be introduced into the flame space of the electric furnaces. This preheater E for the gases is suitably constructed in direct connection with the electric furnaces F to avoid radiation of heat from the latter. To effect the condensation of the greatest possible quantity of the nitrogen oxids and allow of constructing the refrigeration plant with its expenditure of power as small as possible it is of advantage to work with the highest possible pressure in the cyclic system. Moreover in order to recover the residual gases absorbed in the dry bases, the nitrate formed by these bases may be heated, so as to decompose the same. This is most simply effected by passing a part of the hot gases from the electric furnaces in contact with the nitrate and then back to the absorption system, where the nitrogen compounds are for the greater part separated out in the refrigeration plant. This may be carried out in the manner, that as soon as the dry bases have been sufficiently saturated with nitrogen compounds the absorption tower is disconnected from the circulation system at a point in rear of the refrigeration plant and connecting it directly in rear of the furnaces.

This can readily be done by suitable arrangement of valves or dampers in the system.

In the drawings I have diagrammatically shown a plant for carrying out my process. I have shown two absorption towers A and B filled with an alkaline absorption material, as briquets of burnt lime or slaked lime. By means of valves or dampers V to $V_{10}$ these towers may be connected to or disconnected from the circulation system, as desired.

When the dampers $V_1$, $V_8$, $V_2$ and $V_3$ are open and all the others closed, gases from the electric furnace F pass through pipe J into the condensing or refrigerating apparatus C, the condensed nitrogen tetroxid $N_2O_4$ being drawn off at K, while the uncondensed gases pass by pipe L through the heat interchanger D to be reheated preparatory to absorption. These uncondensed gases pass by pipe L through the heat interchanger D, pipes M and S into the absorber A. The gases then pass damper $V_3$ into pipe N and heat interchanger E, where they are highly heated preparatory to being forced by the blower G back into the furnace F through the pipe P. In order to compensate for the combined oxygen, oxygen is pumped by pump H into the pipe P leading to the furnace.

When the contents of the tower A have become saturated it is disconnected from the circulation system by closing dampers or valves $V_2$ and $V_3$. By opening valves $V_6$ and $V_{10}$ tower B is placed in circuit.

The tower A can now be emptied of its content of nitrates and replenished with fresh absorption material.

The operation may also be altered, so as to decompose the nitrate in the towers.

When tower A has been saturated, the dampers $V_2$ $V_3$, $V_4$ and $V_5$ are closed, and the remaining ones open. The hot gases from furnace F pass through pipe J and damper $V_6$ into the absorption chamber A, decomposing the calcium nitrate and nitrite therein by the heat of said furnace gases. The combined gases then pass through pipe Q back into pipe J and cooler C, the uncondensed gases passing by pipe L, heat interchanger D, pipe M, valve $V_9$, and pipe T to the absorption tower B, the residual gases passing through damper $V_{10}$, pipe N, heat interchanger E, blower G and pipe P back to the furnace F, being supplied as before with oxygen by pump H.

It is thus possible to maintain continuous working in cyclic system described, by causing the towers A and B to alternately act for absorption.

I claim:

1. The process of absorbing nitrous gases, which comprises condensing a substantial portion of the gases from an electric furnace for the production of nitrogen compounds and re-heating the residual uncondensed nitrogen oxid gases to absorbing temperature, and absorbing said gases in dry bases at a raised temperature.

2. The process of absorbing nitrous gases, which comprises cooling the gases from a nitrogen oxidation furnace by cold residual gases, thereby condensing a substantial portion of the cooled gases, and absorbing residual nitrogen compounds of said gases in dry bases heated by the furnace gases to absorbing condition.

3. The process of recovering nitrous furnace gases, which comprises cooling the gases by cold uncondensed gases, thereby condensing a substantial portion of the cooled gases, absorbing uncondensed nitrogen oxids in a dry base heated by the furnace gases and returning the residue of the gases from the dry base into the cycle of operations.

4. The process of recovering nitrous furnace gases, which comprises cooling the gases by cold uncondensed furnace gases, thereby condensing a substantial portion of the cooled gases, absorbing uncondensed cold gases in lime previously heated by the furnace gases, returning the residual gases into the cycle of operations and decomposing absorption products by hot furnace gases and conducting such products with furnace gases to the condensing stage.

5. The process of recovering nitrous furnace gases, which comprises cooling said gases, thereby condensing a substantial proportion of their nitrogen tetroxid, heating the residual gases by cooling of the furnace gases therewith, absorbing the heated residual gases in dry bases, heating the gases leaving said dry bases and introducing them into the furnace and decomposing the absorption product by uncooled furnace gases and conducting the gaseous products of such decomposition with furnace gases to the cooling and condensing stage.

In testimony that I claim the foregoing as my invention, I have signed my name in presence of two subscribing witnesses.

JENS LASSEN LA COUR.

Witnesses:
C. NORMAN,
C. FABRICIUS HANSEN.